T. TAKAHASHI.
TAILOR'S MEASURING INSTRUMENT.
APPLICATION FILED MAR. 20, 1917.

1,288,279.
Patented Dec. 17, 1918.

INVENTOR
T. TAKAHASHI
BY
F. M. Wright
ATT'Y.

UNITED STATES PATENT OFFICE.

TSUTOMU TAKAHASHI, OF SAN FRANCISCO, CALIFORNIA.

TAILOR'S MEASURING INSTRUMENT.

1,288,279.　　　　　　Specification of Letters Patent.　　Patented Dec. 17, 1918.

Application filed March 20, 1917. Serial No. 155,972.

*To all whom it may concern:*

Be it known that I, TSUTOMU TAKAHASHI, a subject of the Emperor of Japan, residing at San Francisco, in the county of San Francisco and State of California, have invented new and useful Improvements in Tailors' Measuring Instruments, of which the following is a specification.

The object of the present invention is to provide an improved measuring instrument for the use of tailors in measuring for suits of clothes, by means of which measurements may be made of the lengths, sizes, or relative locations of many different parts of the garment.

Figure 3:
Figure 1:
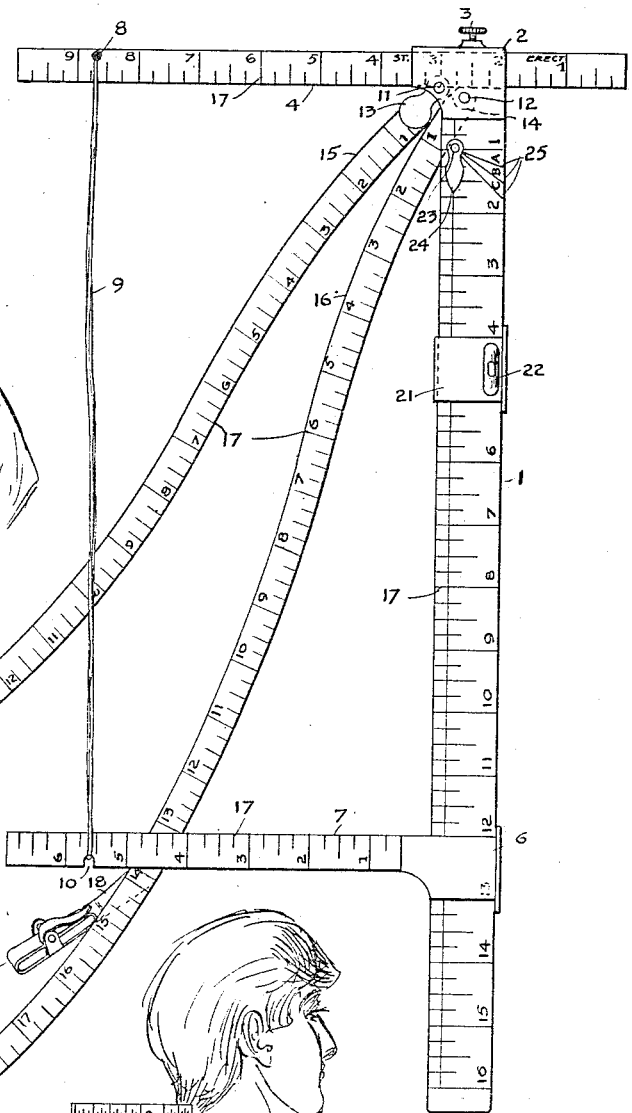
Figure 2:
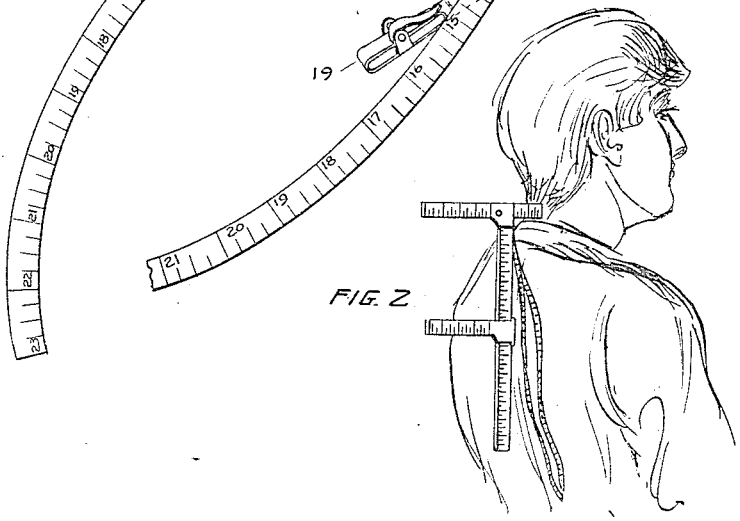

In the accompanying drawings, Figure 1 is a side view of my improved measuring instrument; Fig. 2 is a perspective view showing one mode of use of the instrument; Fig. 3 is a similar view showing another mode of use thereof.

Referring to the drawing 1 indicates a straight piece of wood or other suitable material, in form resembling a ruler, but have at one end a metallic guide piece 2, through which can slide, and be clamped in any position therein by a clamping screw 3, a cross-arm 4. Also slidable upon said piece 1 is a metallic slide piece 6 having secured thereto a cross-arm 7. Through a hole 8 in the cross-arm 4 extends a rubber band 9, which can be passed around the cross-arm 7 and into a notch 10 in the farther edge thereof.

Secured to the guide-piece 2 by pivot pins 11, 12, are metallic terminal pieces 13, 14, secured respectively to ends of tapes 15, 16.

Said pieces 1, 4, 7, and the tapes 15, 16 are suitably graduated as shown at 17.

To the tape 16 is secured one end of a tag 18, the other end of which is secured to a metal clamp piece 19. Secured to the main piece 1 is a metallic container 21 for a level glass 22. Pivoted, as shown at 23, to a side of the main piece 1, is a pointed hanger 24, and extending radially from the pivot are marked, on the same side of the piece 1, lines 25. The hanger enables it to be determined whether the piece 1 is vertical or horizontal or at any desired inclination.

The uses of my improved measuring instrument are many. Perhaps the most important use is that of measuring the degree in which the person being fitted stoops or stands erect. For this purpose, as shown in Fig. 2, the main piece 1 is placed in an upright position with its inner edge 26 in contact with the person's back, and the upper cross-piece 4 is then moved through the guide piece 2 until the inner end of the cross-piece just reaches the person's neck. The length of said cross-piece from the neck to the main piece 1 will indicate the extent to which the person stoops. Fig. 3 illustrates another use of the invention. In this use the main piece 1 is placed beneath the armpit with the cross arms 4 and 7 projecting upwardly on opposite sides of the shoulder, and the band 9 is secured in the notch 10. The level 22 assists in determining when the piece 1 is horizontal. Then the tape 16 is extended in a horizontal direction across the middle of the back, and the clamp 19 is secured to a garment of the person to be fitted. The distance to the middle of the back is then noted. At the same time the tape 15 is extended over the shoulder to a point slightly below the middle of the back of the neck of the person being fitted, and the distance on said tape is noted. Or, as shown in dotted lines in Fig. 3, said tape 15 may be extended around the shoulder to meet the tape 16 at the middle of the back, and the distance on the tape noted.

Other uses which may be briefly mentioned are:—

To determine whether the person being fitted has a flat back or a round back and the degree of rotundity of the back; the degree of slope of the shoulder, for which purpose the level 22 is of assistance; whether one shoulder is higher or lower than the other, and if so, how much higher or lower; in case of corpulency, to measure the degree thereof; to measure the height of the breast, whether the person being fitted has a high breast or a low breast, and, also, if pigeon breasted; to measure the extent to which a person is knock-kneed or bowlegged. Various other measurements, which need not be herein specified, can be made by my improved instrument.

I claim:—

1. A device of the character described comprising a main straight piece having at one end a guide way, a cross arm slidable in said guide way transversely to the main piece, means for securing the cross arm in position in the guide way, a second cross arm, one end of which is slidable longitudinally upon the main piece, said piece and first-named cross arm being graduated, and two tape measures extending from the guide way.

2. A device of the character described comprising a main straight piece having at one end a guide way, a cross arm slidable in said guide way transversely to the main piece, means for securing the cross arm in position in the guide way, a second cross arm, one end of which is slidable longitudinally upon the main piece, said piece and first named cross arm being graduated, a tape measure extending from the guide way, and a clamp secured to said tape measure.

3. A device of the character described comprising a main straight piece having at one end a guide way, a cross arm slidable in said guide way transversely to the main piece, means for securing the cross arm in position in the guide way, a second cross arm, one end of which is slidable longitudinally upon the main piece, said piece and first-named cross arm being graduated, and a level carried by said main piece.

4. A device of the character described comprising a main straight piece having at one end a guide way, a cross arm slidable in said guide way transversely to the main piece, means for securing the cross arm in position in the guide way, a second cross arm, one end of which is slidable longitudinally upon the main piece, said piece and first-named cross arm being graduated, and a pivoted hanger carried by said main piece, said main piece having graduations indicating the angle of inclination of the hanger to the main piece.

T. TAKAHASHI.

Copies of this patent may be obtained for five cents each, by addressing the "Commissioner of Patents, Washington, D. C."